June 13, 1972     D. D. SELL     3,669,547
OPTICAL SPECTROMETER WITH TRANSPARENT REFRACTING CHOPPER
Filed Sept. 14, 1970

TRANSPARENT REFRACTING CHOPPER WHICH IS A SECTION OF A FLAT CYLINDRICAL CONE (20)

TRANSPARENT REFRACTING CHOPPER WITH A SPHERICAL SURFACE (30)

INVENTOR
D. D. SELL
BY
ATTORNEY

United States Patent Office 3,669,547
Patented June 13, 1972

3,669,547
OPTICAL SPECTROMETER WITH TRANSPARENT REFRACTING CHOPPER
Darrell Dean Sell, Berkeley Heights, N.J., assignor to Bell Telephone Laboratories, Incorporated, Murray Hill and Berkeley Heights, N.J.
Filed Sept. 14, 1970, Ser. No. 71,910
Int. Cl. G01j 3/08
U.S. Cl. 356—93                                6 Claims

ABSTRACT OF THE DISCLOSURE

A sensitive and versatile apparatus is described for measuring the optical properties of materials. A transparent refracting chopper is used to alternately displace the radiation from the source into the sample and reference beams. Both transmittance and reflection measurements can be made using this apparatus.

BACKGROUND OF THE INVENTION (1) Field of the invention

The invention relates to an apparatus for measuring the optical properties of materials as a function of radiation energy or wavelength.

(2) Description of the prior art

Extensive use is being made today of apparatus which are used to measure the optical properties of materials. Such apparatus are often used as a production line monitor in the manufacture of materials and devices. Also, spectrometers are used as an investigative tool for general laboratory purposes.

Early instruments used for optical measurements contained only a single radiation beam which passed through the sample and into a single detector. The data obtained from these instruments contained not only the effects of sample absorption and reflection but also effects due to variation in source intensity with wavelength and a similar variation in detector sensitivity. In order to obtain meaningful data concerning the optical properties of the sample, extensive and tedious corrections were necessary to account for the source variations and detector sensitivity variations.

Many of the disadvantages of the single beam instruments were removed by the use of two beams in the spectrometer. In this arrangement, the source radiation was split into two beams, one of which passed through the sample to one detector and the other passed directly to a second detector. The second beam was used a reference to correct for variations in source intensity with wavelength or time. The principal disadvantage of double beam spectrometers is that separate detectors and optical paths were used for the sample and reference beams which introduced errors due to the fact the two detectors and optical paths were not equivalent.

More recent spectrometers have made use of a single beam in which the sample is alternately interposed and removed from the radiation beam. In one such arrangement described in detail by D. Beaglehole, Applied Optics 7, 2218 (1968), the sample is mounted on a rotating wheel which alternately interposes and removes the sample from the radiation beam. Only a single optical path and detector are used so that no correction is necessary for the use of multiple optical paths and detectors. However, this optical arrangement severely limits the usefulness of the spectrometer. For example, only samples capable of being mounted on a rotating wheel can be used. Specific parts of the sample cannot be sampled since the radiation beam travels across the sample. The application of external perturbations such as strain or electric field or magnetic field are extremely inconvenient. Also, the use of such an instrument to monitor the optical properties of samples along a production line would be difficult.

Another optical arrangement using the principle of single beam and single detector has been described by U. Gerhardt and G. W. Rubloff, Applied Optics 8, 305 (1969). Here a light pipe is used to collect radiation which enters the detector. This light pipe is rotated in such a way that it alternately collects radiation directly from the monochromator and from the monochromator after reflection from the sample. Thus the detector alternately samples reference radiation directly and sample radiation after reflection from the sample. Such an optical arrangement can only be used for reflection measurements and is limited in versatility since only absolute and not differential measurements can be made.

SUMMARY OF THE INVENTION

The invention is an apparatus for measuring optical properties of samples either differentially or absolutely. A transparent refracting chopper is used to repetitively displace the radiation beam so that it alternately goes through the sample to the detector and then around the sample to the same detector. In certain embodiments of the invention, electronic circuits well known in the prior art are used to convert the reference and sample signals into meaningful outputs such as optical reflectance or optical transmittance.

DETAILED DESCRIPTION

Figure 1:
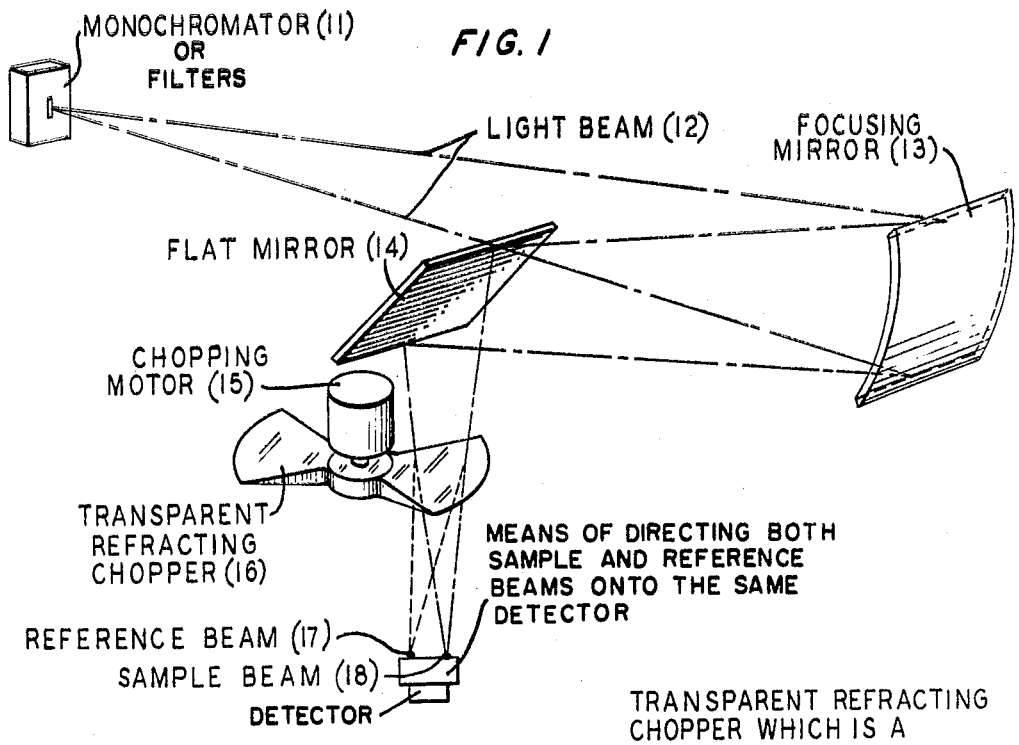
FIG. 1 is a plan view of a portion of a spectrometer showing the transparent refracting chopper.
Figure 2:
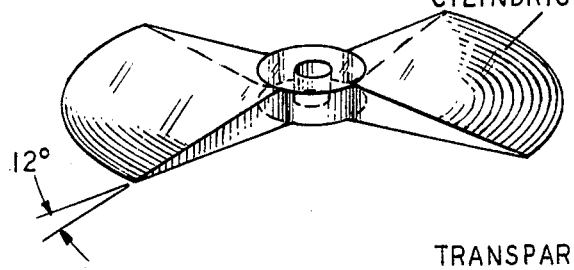
FIG. 2 is a perspective view of a transparent refracting chopper made from a flat cylindrical cone or axicon.
Figure 3:
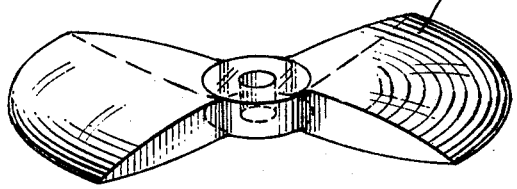
FIG. 3 is a perspective view of a transparent refracting chopper made from a spherical lens.

A portion of the optical system used in the invention aparatus is shown in FIG. 1. An essential element in this optical system is the transparent refracting chopper 16. Exemplary configurations for the transparent refracting chopper are shown in FIGS. 2 and 3. These choppers 20 and 30 are made in one piece with two blades but one or more blades can be used. When the blade intersects the beam, it refracts the beam to a new fixed position. Thus, the blade acts like a thin prism. However, it is preferable that the beam remain stationary when it is passing through the blade. This requires that the chopper be made from a cylindrically symmetric structure with the material between the blades removed. The choppers shown in FIGS. 2 and 3 may be viewed as being formed from a flat cylindrical cone and a spherical lens respectively with the material between the blades removed.

The chopper can be designed in a variety of ways in order to obtain sufficient displacement to move the beam to the sample and away from the sample. The laws of refraction are used in the design of the chopper. The chopper shown in FIG. 2 is typical. It has a diameter of 9.5 centimeters with a 12 degree angle between front and rear faces. In this case, the undeviated beam was focussed on the sample and the chopper was placed approximately 10 centimeters ahead of the focus. The focus of the undeviated sample beam and deviated reference beam was separated by approximately one centimeter. In other designs the sample and reference beams might be interchanged so that the deviated beam passes through the sample and the undeviated beam is the reference beam.

In more sophisticated designs where greater care is required to match the optical properties of the components in the sample and reference beams, both beams might be subject to refraction in order to displace the focus in opposite directions.

The choppers shown in FIGS. 2 and 3 were made from ultraviolet transmitting fused quartz. Other materials might also be used provided their optical properties, such as transmission and refractive index, are suitable for the optical range of interest. For example, optical glass might be used in the visible region, germanium or silicon in the infrared region and salts such as cesium bromide and potassium bromide in the infrared. Such materials are well known to those experienced in spectroscopy.

Other components of the apparatus are relatively well known and will only be summarized. A source of radiation is used to provide the radiation beam. If this radiation beam contains a broad spectrum of wavelengths, a monochromator 11 is used to select the wavelengths of interest. Interference filters can be used to achieve the same end. Other sources of radiation might be quite narrowband such as lasers or lamps which emit only selected wavelengths. The means for focusing the radiation on a sample are standard; for example, concave focusing mirrors 13 or lenses may be used. A motor 15 is used to rotate the chopper 16. The radiation from the two beams is recombined so as to strike the same detector. Care is used so that errors are not introduced by varying the position of the beam as measurements are taken at different wavelengths.

A detector is used to measure the energy in the sample 18 and reference 17 beams. A variety of detectors can be used depending on the wavelengths region of interest. For example, a photomultiplier tube might be used in the ultraviolet or visible region or a bolometer in the infrared region. A synchronous detector system is used to convert the signal from the radiation detector into a meaningful output, such as transmittance or reflectance.

For transmittance studies, the sample is simply placed in one of the beams and the two beams recombined at the photodetector with a mirror. For reflectance measurements two different configurations are used, one of which yields relative reflectance of the sample and the other absolute reflectance of the sample. For relative measurements, a mirror or total internal reflection prism is placed in the reference beam and the sample and reference beams recombined at the photodetector with a mirror. Here, the sample reflectance is being measured relative to the reflectance of the mirror or prism in the reference beam. For absolute reflectance measurements, a pair of back-to-back 90 degrees reflectors are used. One reflector intercepts the reference beam and directs it toward the detector. The other reflector directs the beam reflected from the sample to the detector.

What is claimed is:

1. In an apparatus for the measurement of optical properties of a sample as a function of wavelength using a source of radiation, a sample path for a sample beam and a reference path for a reference beam and a means of directing both sample and reference beams onto the same detector the improvement comprising a transparent refracting chopper for alternately directing radiation from said source along said sample and reference paths, said chopper having a cylindrically symmetric structure with non-parallel surfaces so as to change the angular direction of the radiation whereby the sample beam is made incident on the sample to be measured.

2. The apparatus of claim 1 in which the source of radiation comprises a monochromator used to select the wavelength of the radiation.

3. The apparatus of claim 1 in which the source of radiation comprises filters used to select the wavelength of the radiation.

4. The apparatus of claim 1 in which the transparent refracting chopper is a section of a flat cylindrical cone.

5. The apparatus of claim 1 in which the transparent refracting chopper has a spherical surface.

6. The apparatus of claim 1 in which the transparent refracting chopper is made of fused quartz.

References Cited

UNITED STATES PATENTS

| 3,242,796 | 3/1966 | Strickler | 356—95 |
| 3,080,788 | 3/1963 | Saunderson | 356—80 |
| 3,416,864 | 12/1968 | Keahl et al. | 356—100 |

RONALD L. WIBERT, Primary Examiner

F. L. EVANS, Assistant Examiner

U.S. Cl. X.R.

350—6, 285; 356—95, 97, 205